United States Patent [19]

Tihanyi

[11] Patent Number: 4,544,823
[45] Date of Patent: Oct. 1, 1985

[54] ARC PERCUSSION WELDING A PLATED PIN TO A THIN TAB OF DISSIMILAR METAL

[75] Inventor: George Tihanyi, Montreal, Canada

[73] Assignee: Northern Telecom Limited, Montreal, Canada

[21] Appl. No.: 508,085

[22] Filed: Jun. 27, 1983

[51] Int. Cl.⁴ ................................................ B23K 9/00
[52] U.S. Cl. ...................... 219/121 PK; 219/121 PY; 219/107; 219/137 WM
[58] Field of Search .................. 219/121 PA, 121 PB, 219/121 P, 97, 98, 99, 100, 101, 107, 118, 104, 137 WM, 137 R, 121 PJ, 121 PK

[56] References Cited

U.S. PATENT DOCUMENTS

| | | | |
|---|---|---|---|
| 2,231,480 | 2/1941 | Pilger | 219/99 X |
| 2,256,480 | 9/1941 | Hughes | 219/99 X |
| 2,491,479 | 12/1949 | Dash | 219/99 X |
| 2,858,414 | 10/1958 | Dash | 219/99 |
| 2,885,531 | 5/1959 | Aversten | 219/99 |
| 3,488,841 | 1/1970 | Stern | 219/99 X |
| 3,505,494 | 4/1970 | Ruetschi | 219/95 X |
| 3,988,563 | 10/1976 | Swengel, Sr. et al. | 219/96 X |
| 4,319,118 | 3/1982 | Chason | 219/118 |

FOREIGN PATENT DOCUMENTS 0710920  6/1965  Canada .................................. 219/107

OTHER PUBLICATIONS

Welding Journal, Sep. 1960, pp. 903-907, "Percussion Welding Using Magnetic Force-A Production Process That Appears Capable of Producing, Very Economically, A High-Quality Full-Area Weld", by F. R. Manning and J. B. Welch.

Metals Handbook, 8th Edition, vol. 6, "Welding and Brazing".

Primary Examiner—M. H. Paschall
Attorney, Agent, or Firm—Sidney T. Jelly

[57] ABSTRACT

To obtain acceptable arc percussion welding of tin plated copper pins to thin brass strip members, the tin must be prevented from becoming trapped in the weld zone and gaseous and other forms of material also being trapped. By giving the end of a pin a smooth, hemispherical profile, the plasma arc is initiated at the center of the pin end and progressively moves radially outwards. This melts the tin plate layer and the tin is caused to flow radially outwards from the weld zone. The copper of the pin and brass of the strip then melt slightly and on impact welding is achieved. The outward flow of tin also assists in causing other undesirable elements being removed from the weld zone.

1 Claim, 8 Drawing Figures

ARC PERCUSSION WELDING A PLATED PIN TO A THIN TAB OF DISSIMILAR METAL

This invention relates to the arc percussion welding of a pin of one metal to a thin tab of a dissimilar metal, the pin being plated. Specifically, a tin plated copper or high-copper alloy pin is welded to a brass tab.

Arc percussion welding is well known and provides a ready means of welding metal parts together. High quality welds can be obtained and accurate control of dimensions can be maintained. However, to obtain high quality welds it is necessary that the opposed surfaces brought into contact be of bare metal, that is the base metal. If one of the members is plated then it is necessary that the plating be removed at the position of the intended weld, or that plating at this position be prevented.

Removing plating is an expensive procedure, relative to the cost of the members. Preventing plating is extremely difficult, as the pins are plated in bulk. A particular use of the pins and tabs is in protector modules for telecommunications systems, and large numbers are required. It is essential therefore that the cost be kept to a minimum. At the same time the quality of welds must be high.

It is therefore desirable that the pin and tab be welded without removing the tin plate. For a high quality weld it is necessary that the tin be removed from the weld area. If tin remains in the weld area voids and other undesirable characteristics are created in the weld. This is at least partly due to the tin trapping zinc vapour, the zinc originating from the brass. With conventional welding techniques, the tin has not been removed from the weld area. Further it has been expected that the presence of the tin would prevent effective removal of any gases.

The present invention provides for welding a copper or high copper alloy pin to a thin brass strip, the pin being tin plated, by arc percussion welding, by providing the pin with a profiled end—specifically a rounded end.

The invention will be readily understood by the following description in conjunction with the accompanying drawings, in which.

Figure 1:
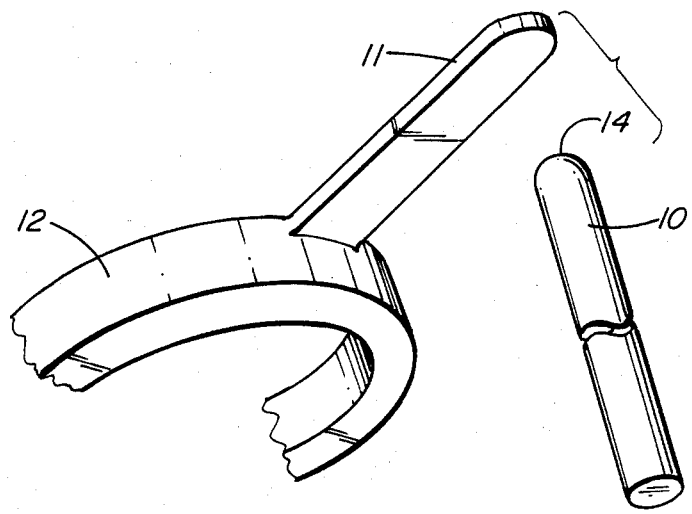
FIG. 1 is a perspective view of a pin and tab prior to welding.

In FIG. 1 a terminal pin 10 is to be attached to a thin tab 11 extending from a sleeve 12. The terminal pin is usually of copper, but may be of a high copper alloy, and is tin plated all over. The tab, and the sleeve, is of brass. The terminal pin and sleeve are part of a voltage or surge protector for a telecommunications system. These items are very small, for example the pin 10 is usually about 0.063 inches in diameter after plating. Tolerances are very tight as clearances in the module are very small. The pin 10 must be accurately positioned on the tab 11 and be square to the tab, after welding. In accordance with the present invention the pin 10 is given a smooth rounded end 14, that is hemispherical.

Figure 2:
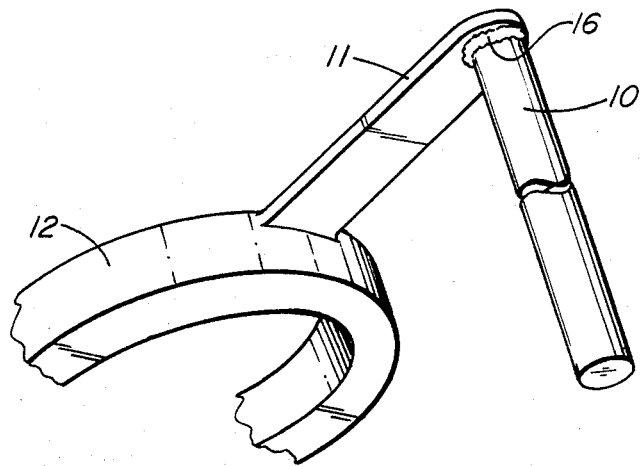
FIG. 2 is a perspective view of the pin and tab after welding.

In FIG. 2 the pin is shown welded to the tab 11, a ring of extruded metal being indicated at 16. The weld between the pin and the tab should be free of voids and inclusions and it is necessary, as previously stated, that the tin plating on the end of the pin be displaced. This is obtained by creating a progressive movement of welding radially outwards and this is obtained by the unique shaping of the end of the pin.

With the rounded end, the arc is initially struck or started from the center of the pin but as the pin end melts under the effect of the arc, the arc extends radially, causing tin to be moved radially out of the weld zone.

Various ways have been proposed for initiating the arc, including forming one member with a spike, or a pointed end. However, this creates a very high initial concentration of power. This causes penetration of the other member and also causes fairly drastic expulsion of metal from the weld area. With a thin metal tab as the other member, a hole could be formed right through the tab and no weld is likely to occur. It is for the avoidance of such a penetration that hitherto the pin has been provided with a flat end. However, this flat end has increased the entrapment of gases, to cause voids and also increases the possibility of undesirable particles being trapped. The use of different alloying metals increases the possibility of gas entrapment as some will melt before others and become gaseous while others are still liquid. This increases the probability of entrapment. A flat end is very difficult to position exactly parallel to the other member. It is necessary that the weld start at the pin center line, but if the surfaces being welded are not perfectly parallel, the weld starts at one edge and a poor or contaminated weld results.

With the smooth rounded end, as explained, the initial arc occurs at the center of the pin, but is not so highly concentrated. Limited penetration into the tab occurs and the end of the pin flattens with the arc moving outwards. There occurs a more uniform flow of current and no explosive condition occurs, with the associated ejection of metal. The progression of the weld radially from the center causes the tin of the tin plate to flow outwards, exposing the copper, the final weld being between the copper and the brass. The sequence is that the air gap is ionized, the arc forms, tin melts and flows outwards to expose copper, then copper and brass weld. Any gases formed are enabled to flow out as the tin moves out.

Figure 3A:
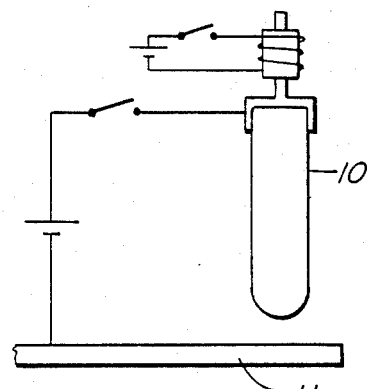
FIG. 3 is a diagrammatic illustration of sequential steps of welding a pin to a tab.
Figure 3B:
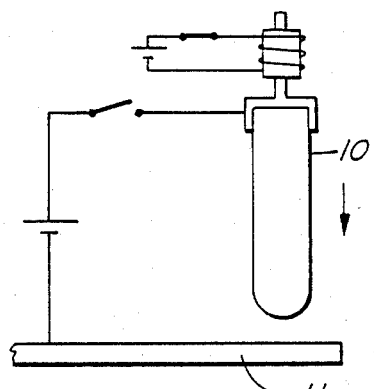
Figure 3C:
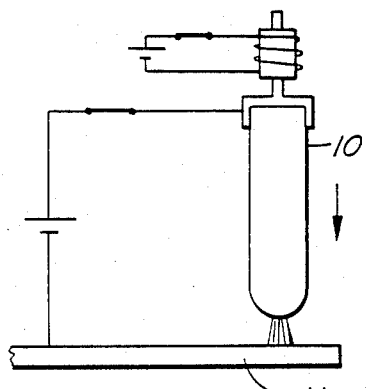
Figure 3D:
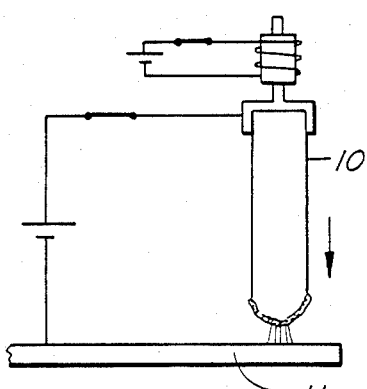
Figure 3E:
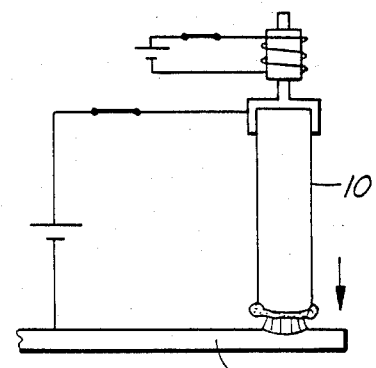
Figure 3F:
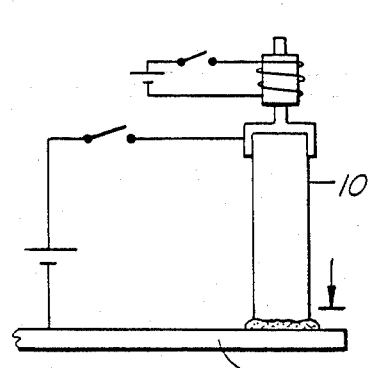

The process of arc percussion welding is well known, and it is sufficient to only briefly describe the process in respect to the present invention. The members to be welded are mounted in work holders with an appropriate gap therebetween. One of the work holders is movable, as by a solenoid 18 (FIG. 3a). The process is initiated by application of energy to the solenoid to begin moving the movable work holder (FIG. 3b). Simultaneously an electronic delay is started. Upon completion of the delay, electrical power is applied to the work holders and the members held therein. A RF spark is generated across the remaining gap which ionizes the air in the gap. This generates a plasmic arc of extremely high temperature and short duration (FIG. 3c). During this the movable work holder is moving towards the other work holder. While the arc is in being the two members held in the work holders are impacted and become welded together, by reason of molten metal on the two members produced by the arc, the arc being de-energized (FIG. 3f).

This process is as used for welding the pin 10 to the tab 11. The plasmic arc lasts at least the time necessary for it to spread from the initial striking between the center of the end of the pin and the tab until it extends over the whole end of the pin.

An example of an arc percussion welding machine is the Model 528 A power supply and Model 724 A bench fixture obtained from Superior Welding Manufacturing Corp., New Bedford, Mass. having the following specifications:

| Input: | 110 to 120 V AC 60 Hz 10A peak and 400 w at full power and rating |
|---|---|
| Stored Energy: | 60 ws |
| Capacitance Selection: | 3 Values (300 f, 1400 f and 6400 f) |
| Voltage selection: | 8 Steps (35 to 140 V) |
| Actuator Velocity: | 0 to 100 (0 to 8 joules into 3 ohms), corresponding to a velocity of 0-25 inches per sec. |
| Timing: | 0 to 100 (0.5 to 5.0 microsecs.) |
| Triggering: | Single contact closure or direct logic drive |
| Remote Timing: | Single contact opening or direct logic drive |
| Polarity: | Either selectable |
| Repetition Rate: | 2 Welds per second, intermittent and continuous duty |
| Cap at Ionization: | 0.030 inch max. in dry air STP |

An example of the criteria used for welding pins to tabs is as follows:

| Velocity: | 7 |
|---|---|
| Time: | 0.5 sec. |
| Voltage: | 110 V AC |
| Capacitance: | 300 f |
| Polarity: | positive |
| Short pulse gap: | 0.030" |

A typical pin diameter, as stated above, is about 0.063 inches after tin plating, a typical thickness of the tab being 0.015" and 0.060" wide. The pin end is normally hemispherical, i.e. of a spherical contour or profile. The resulting welds were of high quality and consistent. Only minimal penetration of the tab occured, sufficient to provide welding with the pin. The tin plate on the end of the pin was caused to flow out radially and was present in the ring of extruded metal-16 in FIG. 2.

As a result of consistent, high quality welds, inspection after welding can be reduced. Because of the rounded end of the pin, consistent accurate positioning and orientation of the pin relative to the tab is obtained. This also reduces inspection requirements and eases following stages of assembly.

What is claimed is:

1. A method of arc percussion welding an end of a tin plated pin, said pin composed of high copper content material, to a thin brass strip, including forming said end of said pin to a smooth substantially hemispherical profile prior to tin plating, the tin plating extending over said hemispherical profile.

* * * * *